United States Patent [19]
Borgwardt

[11] Patent Number: 5,682,209
[45] Date of Patent: Oct. 28, 1997

[54] MOTION ESTIMATION USING LIMITED-TIME EARLY EXIT WITH PREQUALIFICATION MATRICES AND A PREDICTED SEARCH CENTER

[75] Inventor: Peter A. Borgwardt, Portland, Oreg.

[73] Assignee: Tektronix, Inc., Wilsonville, Oreg.

[21] Appl. No.: 556,481

[22] Filed: Nov. 13, 1995

[51] Int. Cl.$^6$ ........................................... H04N 7/34
[52] U.S. Cl. ............................... 348/699; 348/416
[58] Field of Search .............................. 348/699, 402, 348/407, 413, 416; H04N 7/34

[56] References Cited

U.S. PATENT DOCUMENTS

| 4,383,272 | 5/1983 | Netravali | 348/416 |
| 5,162,907 | 11/1992 | Keating | 348/699 |
| 5,583,580 | 12/1996 | Jung | 348/699 |

*Primary Examiner*—Howard W. Britton

[57] ABSTRACT

Motion estimation using limited-time early exit with prequalification matrices and a predicted search center reduces computational time for a video compression encoder. The partial absolute error obtained for a given location within a search area is compared periodically with a prior absolute error obtained for a prior position within the search area to determine whether the partial absolute error is greater than such prior absolute error. If the partial absolute error is greater, then the processing for that position may be terminated and the search moved to the next location within the search area. Using the triangle inequality a series of prequalification matrices are generated for the reference image and for the current image being searched. Comparing the prequalification matrices using early exit further reduces the computational time. Also by using a motion vector for a neighboring block of pixels to determine a predicted center point within the search area, one of the first few locations within the search area generally produces the best difference, so that all subsequent locations result in early exit, reducing computational time even further. Finally to assure that the motion vectors for a frame are determined within realtime constraints, the amount of time required to process a block as measured in terms of a number of AbsSum8 operations is used to terminate the processing of a block if the processing has not yet produced a final absolute error minimum. For those blocks which complete early, the saved "time" is averaged over the remaining blocks.

1 Claim, 4 Drawing Sheets

MOTION ESTIMATION USING LIMITED-TIME EARLY EXIT WITH PREQUALIFICATION MATRICES AND A PREDICTED SEARCH CENTER

BACKGROUND OF THE INVENTION

The present invention relates to encoding of video image sequences, and more particularly to a method of faster motion estimation using limited-time early exit with prequalification matrices and a predicted search center that greatly reduces the computation needed for full pixel estimation of motion vectors.

Video and many medical images are received as sequences of two-dimensional image frames or fields. To transmit such sequences over existing transmission media, it is often necessary to compress the sequences. One form of video data compression includes interframe coding techniques that use the redundancy between successive frames/fields. In these techniques the information defining elements of an image (frame/field) in the sequence are estimated by interpolation using information from related locations in preceding and/or succeeding frames/fields of the sequence, as described in U.S. Pat. No. 4,383,272 issued on May 10, 1983 to Netravali et al entitled "Video Signal Interpolation Using Motion Estimation." The interpolation is performed by first estimating the motion trajectory, motion vector or displacement vector, of each pixel between successive frames/fields. These displacement vectors are used to project each pixel along its trajectory from one frame/field to the next, resulting in motion compensated prediction or interpolation. In practice motion vectors are estimated for blocks of pixels so that the displacements are piecewise constant. One type of such a compression device is shown in FIG. 1 where an input video signal is input to a pre-processor for frame reordering. The reordered video signal is then input to a motion estimator for the motion interpolation, as discussed above. Also input to the motion estimator is a reference video frame. The outputs from the motion estimator are a motion vector and a series of video differences for each pixel between the current video frame being compressed and the reference frame. The differences are discrete cosine transformed and quantized, and the resulting quantized coefficients are encoded before being output as part of the compressed video signal together with the motion vector. An inverse quantizer and inverse DCT recreate the differences which are combined with the reference frame as a function of the motion vector to produce the next reference frame.

Block matching is often used to estimate the motion vector associated with each block of pixels in a current coding frame/field. In these methods the motion vector for each block in the current frame/field is estimated by searching through a larger search window in the previous and/or succeeding frame/field as a reference frame/field for a best match. The motion estimator compares a block of pixels in the current frame with a block in the reference frame by computing a distortion image, as shown in the block diagram of FIG. 2. Each block in the current image is compared to displaced blocks at different locations in the reference frame and the displacement vector $(\Delta x, \Delta y)$ that gives the minimum value of the distortion function is selected as being the best representation of the motion vector for that block.

For a block of MxN pixels, at (x,y) the distortion function $D_{(x,y)}(\Delta x, \Delta y)$ for a displacement of $(\Delta x, \Delta y)$ may be given as $$D_{(x,y)}(\Delta x, \Delta y) = \sum_{i=0}^{M-1} \sum_{j=0}^{N-1} f(v(x+i, y+j) - u(x+\Delta x+i, y+\Delta y+j))$$

where $u(x,y)$ is the reference frame, $v(x,y)$ is the current frame, and $f(x)$ is a given positive and increasing function of x. In general the candidate displacement vector $(\Delta x, \Delta y)$ is restricted to a preselected $[-p_1, p_2] \times [-q_1, q_2]$ search region. Some useful choices for $f(x)$ are $|x|$, called absolute error (AE), and $x^2$, called mean square error (MSE). Minimizing $D_{(x,y)}$ for various $(\Delta x, \Delta y)$s at a given (x,y) gives the displacement vector for the block (x,y).

As an example each frame is divided into blocks that correspond to 16×16 luminance pixels in the frame, with resulting vectors applied in a proportional way to the associated chrominance information for the same area of the image. The encoder needs to decide on a motion vector for each block in the image, i.e., for each past and future reference frame. For a block that starts at (x,y) the vector $(\Delta x, \Delta y)$ indicates that the 16×16 displaced block in the reference frame starting at $(x+\Delta x, y+\Delta y)$ is used to predict the block in the current frame. A typical method used by encoders to decide on a motion vector is to explore a search area in the reference frame for that 16×16 displaced block that has the minimum absolute error (MAE) with respect to the current block. Using the AE distortion function for 16×16 blocks $$AE_{(x,y)}(\Delta x, \Delta y) = \sum_{i=0}^{15} \sum_{j=0}^{15} |v(x+i, y+j) - u(x+\Delta x+i, y+\Delta y+j)|$$

The search range for a given vector determines both the quality of the vector to capture large motions in the video and also the expense of finding the vector. $\Delta x$ and $\Delta y$ may have separate search ranges. For this discussion the search range is 64×32 with the ranges [-32,31] in x and [-16,15] in y.

The straight forward Exhaustive Search method is a simple but very expensive way to find the vector with the MAE for a given block. The Exhaustive Search method is to find the value of the AE distortion function at every position in the search range in order to determine the minimum. If AbsSum8 is the sum of absolute differences for 8 pixels of a block, to do Exhaustive Search for a frame vector over the 64×32 search range requires 32 AbsSum8 operations on each of 2048 $(\Delta x, \Delta y)$ positions in the search range, for a cost of 65,536 AbsSum8 operations. The Exhaustive Search approach is feasible for systolic arrays in ASICs, but is way too costly for processor-based implementations, as the total for frame vectors for video with 1320 blocks/frame at 30 frames/sec is approximately 2.6 billion AbsSum8 operations per second.

Hierarchical Search is a second search strategy that is more cost-efficient than Exhaustive Search. One example of Hierarchical Search first searches for the best vector for the block decimated to 8×8 in a decimated reference frame. A simple way to decimate the frame is to average each four neighboring pixels to decimate by 2 in x and y.

$$dec(x,y) = 1/4 \left\{ \sum_{i=0}^{1} \sum_{j=0}^{1} u(2*x+i, 2*y+j) \right.$$

For the 64×32 search range for a frame vector the search is [-16,15] in x and [-8,7] in y. Once the best AE is found at $(\Delta x, \Delta y)$ in the decimated search range, then search is around $(2\Delta x, 2\Delta y)$ in the full resolution frame with a search range of [-1,1] in both x and y. The AE calculation in the decimated search step costs 8 AbsSum8 operations per frame vector, and the second step costs 32 AbsSum8 operations at each of 9 ($\Delta x, \Delta y$) positions, 288 AbsSum8 operations added to the first stage for a total of 4,384 operations per frame. For video this costs 174 million AbsSum8 operations per second, a savings of about 15 to 1 over the Exhaustive Search vector search. The quality loss using Hierarchical Search is minimal, not more than 0.4 db.

What is desired is a faster motion estimation technique that reduces the computational time over Exhaustive and Hierarchical Search techniques in order to be applicable to a realtime system.

SUMMARY OF THE INVENTION

Accordingly the present invention provides faster motion estimation using limited-time early exit with prequalification matrices and a predicted search center to reduce computational time for a video compression encoder. The partial absolute error obtained for a given location within a search area is compared periodically with a prior absolute error obtained for a prior position within the search area to determine whether the partial absolute error is greater than such prior absolute error. If the partial absolute error is greater, then the processing for that position may be terminated and the search moved to the next location within the search area. Using the triangle inequality a series of prequalification matrices are generated for the reference image and for the current image being searched. Comparing the prequalification matrices using early exit further reduces the computational time. Also by using a motion vector for a neighboring block of pixels to determine a predicted center point within the search area, one of the first few locations within the search area generally produces the best difference, so that all subsequent locations result in early exit, reducing computational time even further. Finally to assure that the motion vectors for a frame are determined within realtime constraints, the amount of time required to process a block as measured in terms of a number of AbsSum8 operations is used to terminate the processing of a block if the processing has not yet produced a final absolute error minimum. For those blocks which complete early, the saved "time" is averaged over the remaining blocks. Therefore the use of these four techniques—Early Exit, Prequalification Matrices, Limited-Time and Predicted Search Center—together produces an improvement of up to 13 to 1 over conventional Exhaustive or Hierarchical Search techniques.

The objects, advantages and other novel features of the present invention are apparent from the following detailed description when read in conjunction with the appended claims and attached drawing.

DESCRIPTION OF THE PREFERRED EMBODIMENT

There are four components that work together: Early Exit Search, Prequalification Matrices, Limited-Time per Block and a Predicted Center for the Search. The Early Exit search notes that while calculating the AE for a given ($\Delta x, \Delta y$) search position there is no point in finishing the calculation once the partial AE is larger than the smallest AE (bestdiff) encountered so far in the search. The partial AE after processing K rows of the AE distortion function is given by:

$$PAE^K_{(x,y)}(\Delta x, \Delta y) = \sum_{i=0}^{K-1} \sum_{j=0}^{15} |v(x+i, y+j) - u(x+\Delta x+i, y+\Delta y+j)|$$

Thus after processing each row of the AE calculations this condition is tested for an "early exit". This simple change alone speeds up the Exhaustive Search method by up to three-fold.

This computational savings is further extended by adding the Prequalification Matrices technique, noting the triangle inequality that says:

$$|x_0-y_0|+|x_1-y_1| \geq |(x_0+x_1)-(y_0+y_1)|$$

and more generally:

$$\sum_{i=1}^{N} |v_i - u_i| \geq \left| \sum_{i=1}^{N} v_i - \sum_{i=1}^{N} u_i \right|$$

Now if the sum $\Sigma v_i$ is over some of the elements of the 16×16 block, then if the sum on the right is larger than bestdiff, the best AE found so far, then the AE on the left is also too large. This means that if several pixels have already been added together before a search, then the triangle inequality may be used to prequalify each ($\Delta x, \Delta y$) position.

As a specific example three flame-sized matrices, preref0, preref1 and preref2, are defined. preref0 consists of the sums of 4×4 rectangles of pixels starting from each pixel in the reference frame.

$$preref0(x,y) = \sum_{i=0}^{3} \sum_{j=0}^{3} u(x+i, y+j)$$

preref1 consists of the sums of 8×8 rectangles of pixels starting from each pixel.

$$preref1(x,y) = \sum_{i=0}^{7} \sum_{j=0}^{7} u(x+i, y+j)$$

preref2 consists of the sums of 16×16 rectangles of pixels starting from each pixel.

$$preref2(x,y) = \sum_{i=0}^{15} \sum_{j=0}^{15} u(x+i, y+j)$$

Likewise three matrices are formed from the current frame to match against preref0, preref1 and preref2, namely precur0, precur1 and precur2 respectively. However since block positions (m,n) always have M and N divisible by 16, only precur0(x,y) for x and y divisible by 4, precur1(x,y) for x and y divisible by 8 and precur2(x,y) for x and y divisible by 16 need to be defined. The other (x,y) positions may be left undefined, and hence fewer calculations are needed to set up the precur matrices than for the preref matrices.

$$precur0(x,y) = \sum_{i=0}^{3} \sum_{j=0}^{3} v(x+i, y+j) \text{ for } x,y \text{ each divisible by } 4$$

$$precur1(x,y) = \sum_{i=0}^{7} \sum_{j=0}^{7} v(x+i, y+j) \text{ for } x,y \text{ each divisible by } 8$$

$$precur2(x,y) = \sum_{i=0}^{15} \sum_{j=0}^{15} v(x+i, y+j) \text{ for } x,y \text{ each divisible by } 16$$

Figure 1:
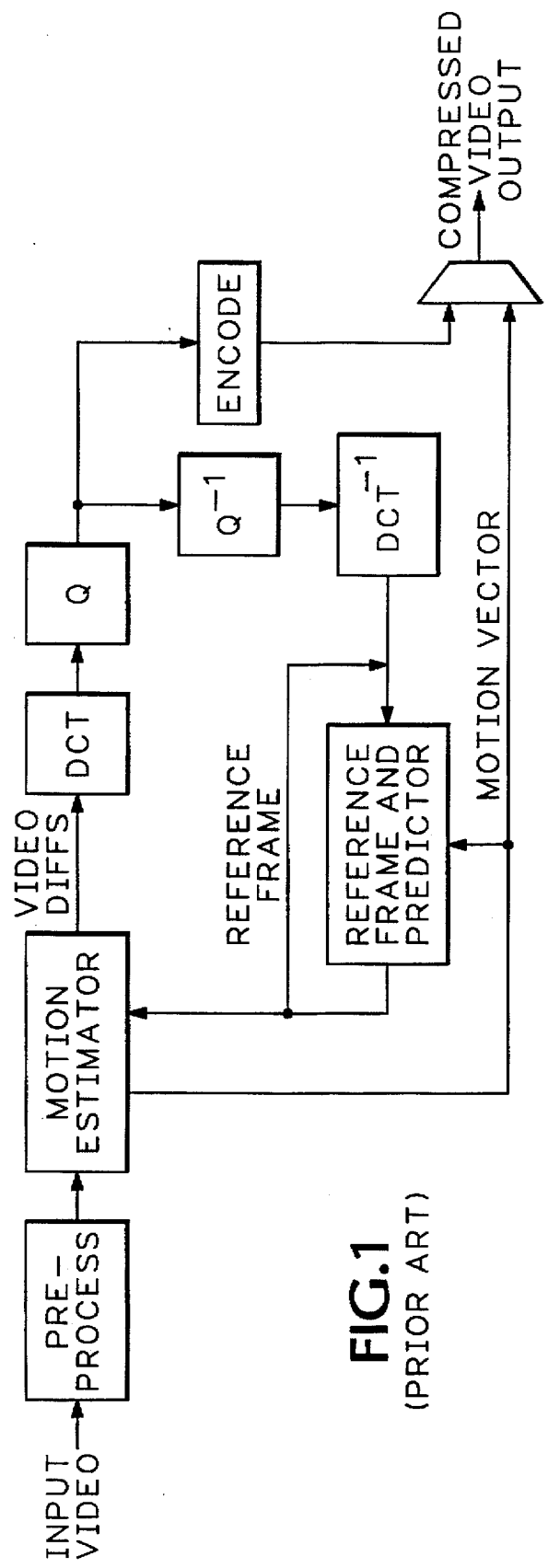
Fig. 1 is a block diagram view of a video compression encoder according to the prior art.
Figure 2:
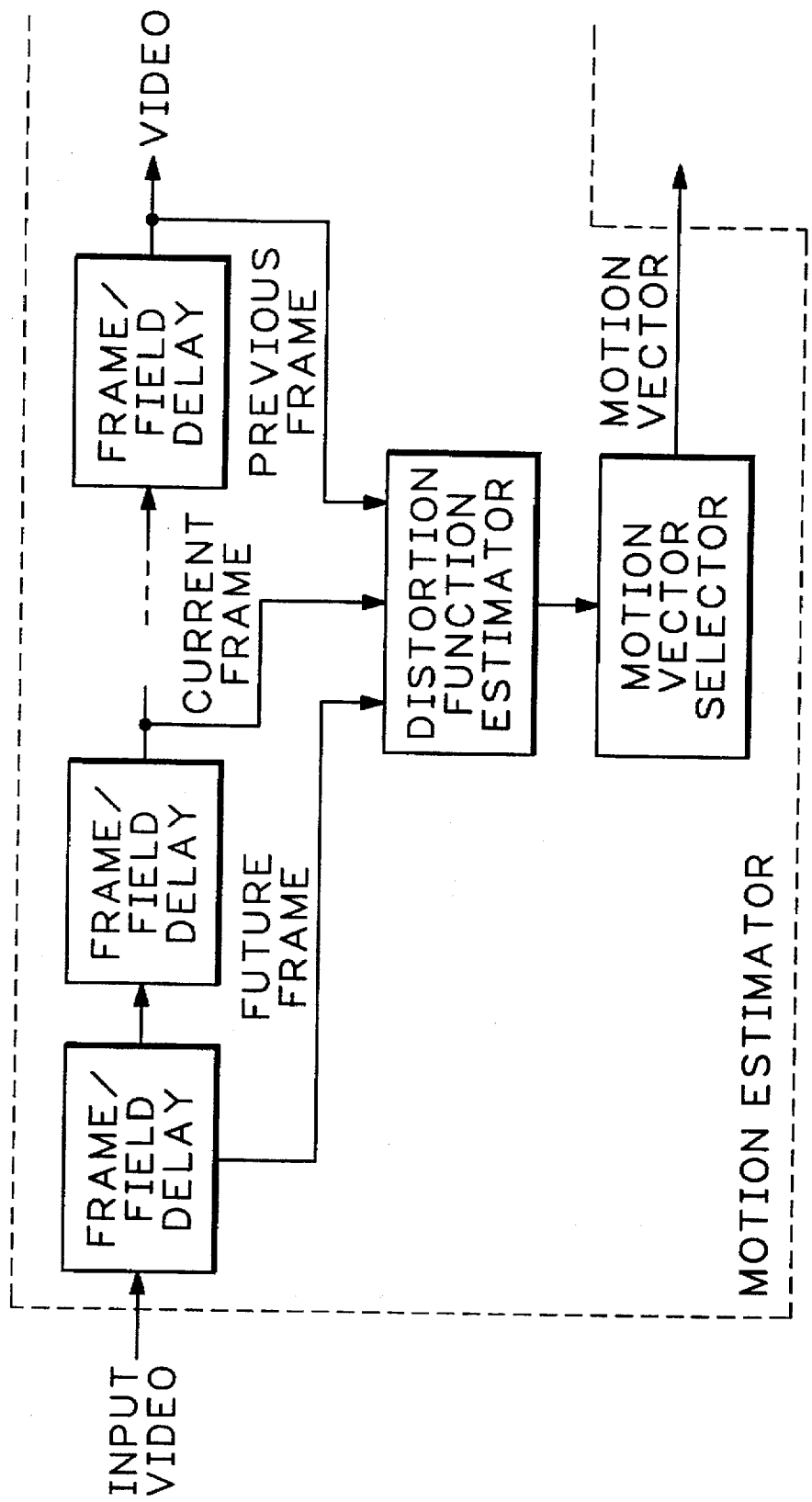
FIG. 2 is a block diagram view of a motion estimator according to the prior art.
Figure 3:
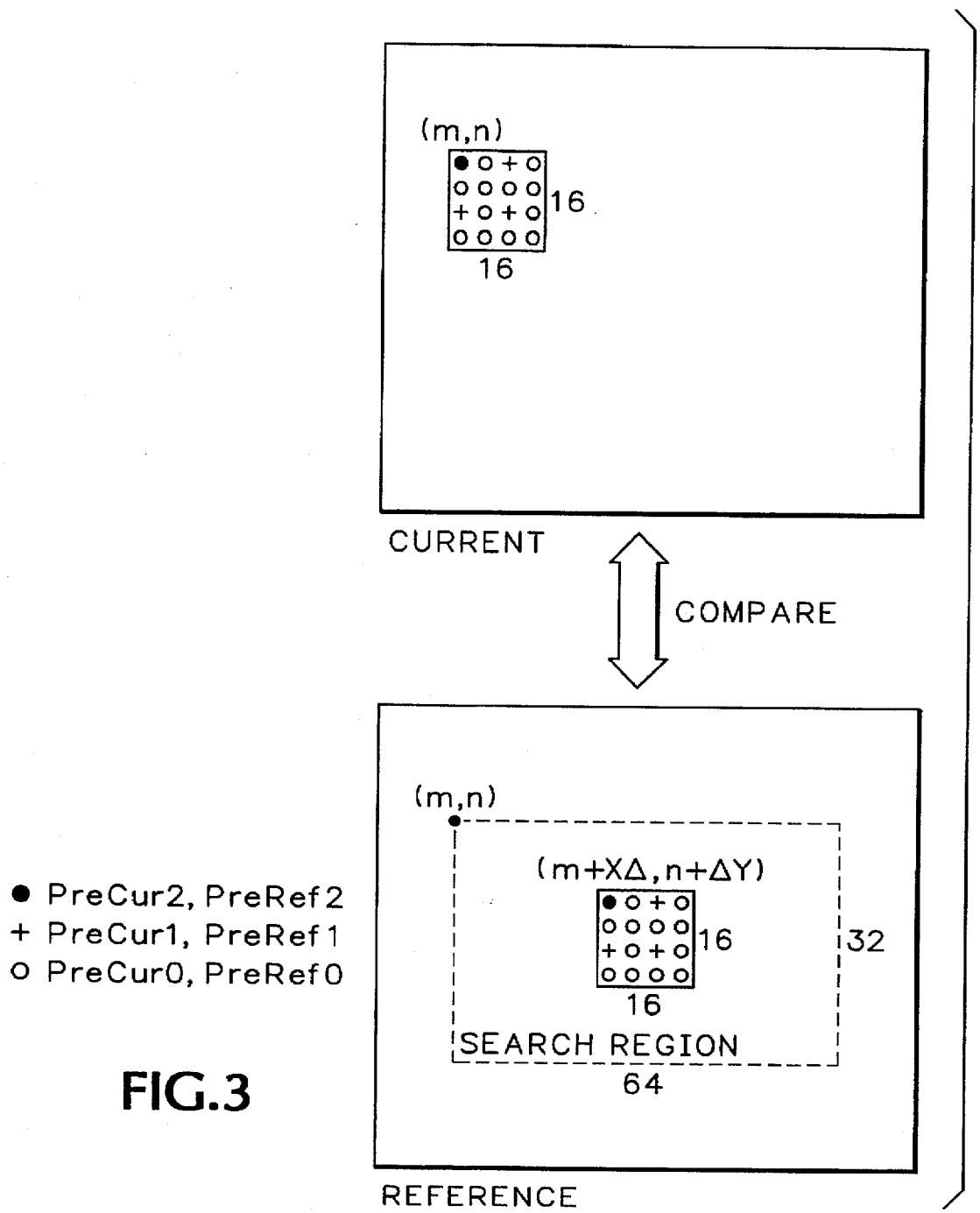
FIG. 3 is an illustrative view of the motion vector generation according to the present invention.

When a current 16×16 block at (m,n) is used to test a vector ($\Delta x, \Delta y$) as shown in FIG. 3, a check is first made:

$$|precur2(m,n) - preref2(m+\Delta x, n+\Delta y)| > bestdiff$$

which, if true, results in an early exit, i.e., this vector is eliminated without further calculation on it. In otherwords, the sum of the coefficients in the two 16×16 blocks are subtracted from each other and compared to the current bestdiff. Otherwise the 2×2 AE of precur1 is checked against preref1 for an early exit as follows:

$$\sum_{i=0}^{1} \sum_{j=0}^{1} |precur1(m+8i, n+8j) -$$

$$preref1(m + \Delta x + 8i, n + \Delta y + 8j)| > bestdiff$$

If this expression is not true, then the following expression is checked:

$$\sum_{i=0}^{3} \sum_{j=0}^{3} |precur0(m+4i, n+4j) -$$

$$preref0(m + \Delta x + 4i, n + \Delta y + 4j)| > bestdiff$$

In both the above equations the test of the partial sum against bestdiff may be made at any stage to do an early exit. If none of the prequalification tests lead to an early exit, then the current block is checked against the reference block at $(\Delta x, \Delta y)$, which either results in an early exit or a finished AE that might become the new bestdiff. This Prequalification Matrices approach averages another three-fold improvement over the simple Early Exit approach, giving as much as a 13 to 1 computational improvement over the Exhaustive Search method.

Early Exit with Prequalification Matrices is similar in some ways to Hierarchical Search motion estimation, except that Hierarchical Search is an approximation while Prequalification Matrices is a guarantee of finding the best result by the triangle inequality. Therefore this technique provides the same video quality as the Exhaustive Search method. Further the present technique may be combined with the Hierarchical Search to make that technique run faster. With Hierarchical Search the preref matrices are formed on the decimated image, resulting in an observed computational improvement of up to 13 to 1 over the Hierarchical Search method alone.

Although Prequalification Matrices is explained above with respect to frames of video data, it works equally well for fields. Also other levels of Prequalification Matrices are covered that are based upon the triangle inequality.

While the result of the Early Exit with Prequalification Matrices is guaranteed to be good, the amount of time required is stochastic, which is unacceptable in a realtime implementation. Therefore to trade off a little quality for a guarantee on the time, a Limited-Time step is used to put a limit on the amount of time that the encoder spends on any given block, expressed in AbsSum8 operations. Whenever the motion estimator hits that limit it stops its search, perhaps finishing the AE for the current $(\Delta x, \Delta y)$ test, and assigns the motion vector to the best that it has found so far. This is made more liberal by allowing any unused time budget for previous blocks in a frame to be spread to later blocks in the frame. In other words if there are Z blocks to be processed in a frame and the total time for processing the frame is T, then each block is given a time budget of T/Z. If the first block takes a time $\Delta t$ less than the allotted budget, then that time is added to the total remaining time to determine the time budget for subsequent blocks, i.e., $(T+\Delta t - n(T/Z))/(Z-n)$ where $\Delta t$ is total time saved and n is the block number just completed.

To prevent too great a loss of quality a Predicted Search Center is used. Instead of beginning the motion vector search for each block at $(\Delta x, \Delta y)=(0,0)$, i.e., at the upper left corner, then moving symmetrically outwards in $\Delta x$, and then outwards in $\Delta y$ up to the limits of the search range ($\Delta y=0$ and $\Delta x=0,-1,1,-2,2,\ldots$; then $\Delta y=-1$ and $\Delta x=0,-1,1,-2,2,\ldots$; then $\Delta y=1,\ldots$ etc.), the search is started at some predicted center. A simple prediction is made by taking the vector just found for the previous block in the row and center the search on that predicted $(\Delta x, \Delta y)=(s,t)$, searching symmetrically outward from that point. At the beginning of each row of blocks the search still begins at $(\Delta x, \Delta y)=(0,0)$. This Predicted Search Center method particularly helps with global pans of the image.

The final result of combining these four techniques produces, when applied to the Hierarchical Search method, a loss of quality of no more than 0.1 db, and no more than 0.4 db compared to the Exhaustive Search method. The AbsSum8 operations limit per block may be set at 800, which is a limit of 32 million AbsSum8 operations per second. This is 5.5 times faster than the simple Hierarchical Search method and 82 times faster than the simple Exhaustive Search method with a minimal loss in quality. Due to the time needed to set up the preref matrices these improvement factors are realistically 3.5 and 52 respectively. Varying the limit from 800 provides a tradeoff of speed versus video quality.

Figure 4:
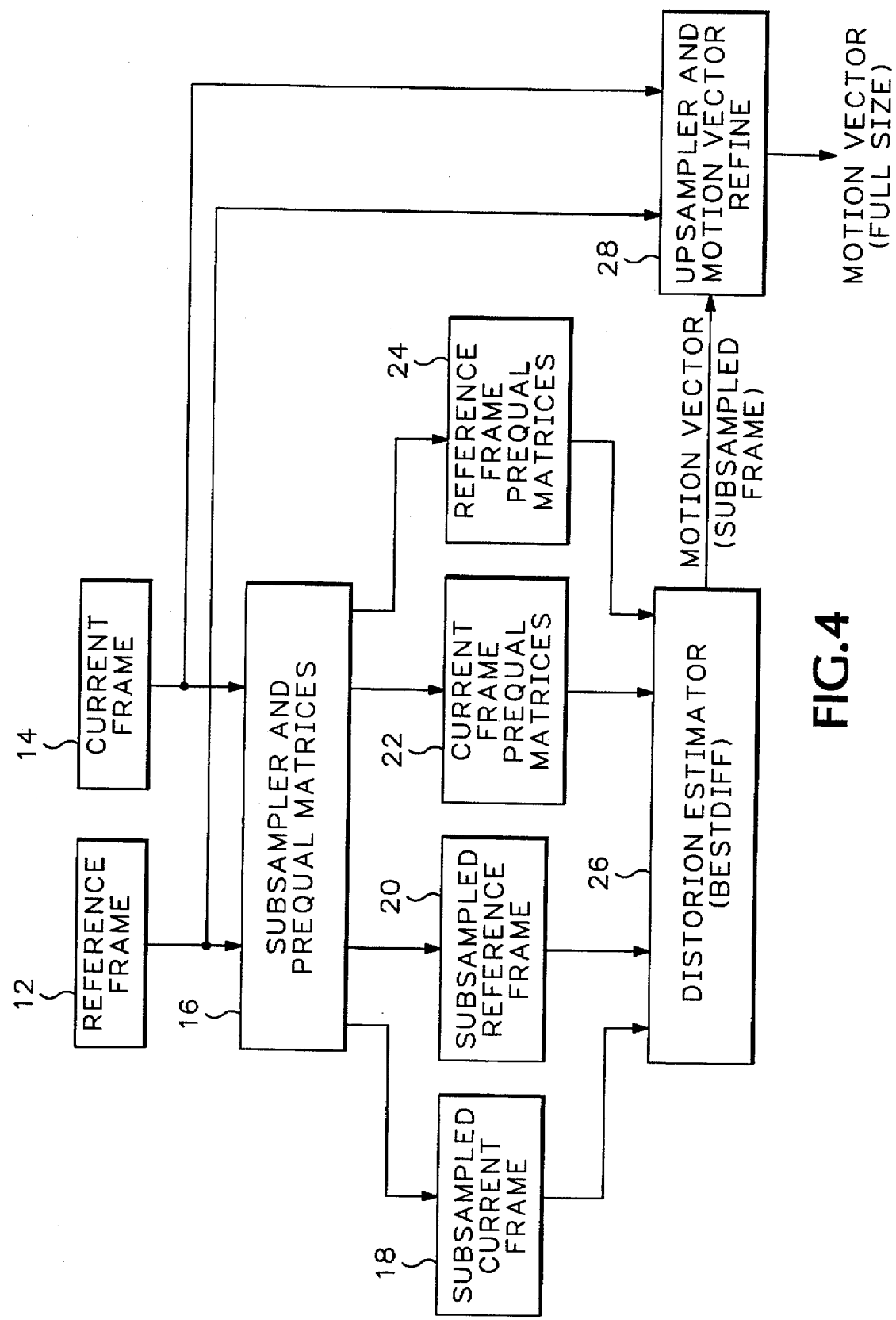
FIG. 4 is a block diagram view of a motion vector generator according to the present invention.

As shown in FIG. 4 the reference frame and current frame from respective frame memories 12, 14 are input to a subsampler for the hierarchical approach and prequalification matrix circuit 16 where the frames are reduced by four and the prequalification matrices prerefn and precurn are determined. The reduced frames and matrices are stored in respective memories 18, 20, 22, 24 from which they are input to a distortion estimator processing circuit 26. The distortion estimator processing circuit 26 performs the prequalification matrices technique using early exit and limited time as well as starting the search area for each block of pixels at a predicted center. The output of the distortion estimator processing circuit 26 is the motion vectors for each block of the subsampled frame (in the hierarchical approach shown) which is then upsampled and applied to the full frames in a motion vector refinement circuit 28 where the motion vector is further processed to better than an integer pixel accuracy.

Thus the present invention provides motion estimation using limited-time early exit with prequalification matrices and a predicted search center for real time video compression.

What is claimed is:

1. A method of determining a motion vector for a block of pixels from a current frame of a video signal in a video compression system comprising the steps of:

generating a set of prequalification matrices for a reference frame of the video signal and for the current frame;

for each possible motion vector in the reference frame within a search area, performing a prequalification matrix comparison for the block of pixels to obtain a best difference value, the search area being centered about a predicted center determined from the motion vector for a prior block of the current frame;

at any point during the performing step comparing a current result against a current best difference value to determine whether early exit for the current vector is appropriate, otherwise determining a new best difference; and assigning the motion vector to the current block that produces a least best difference as a result of the performing and comparing steps within a designated time limit.

* * * * *